(12) United States Patent
Wilks et al.

(10) Patent No.: US 12,173,689 B2
(45) Date of Patent: *Dec. 24, 2024

(54) ULTRACAPACITOR PITCH ENERGY MODULE

(71) Applicant: Richardson Electronics, Ltd., Lafox, IL (US)

(72) Inventors: Jeremy Winston Wilks, Lafox, IL (US); John Raymond Curran, Lafox, IL (US); Brian Christopher Gumino, Lafox, IL (US)

(73) Assignee: Richardson Electronics, Ltd., LaFox, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,961

(22) Filed: Mar. 16, 2023

(65) Prior Publication Data

US 2023/0220828 A1    Jul. 13, 2023

Related U.S. Application Data

(63) Continuation of application No. 17/541,495, filed on Dec. 3, 2021, now Pat. No. 11,624,348, which is a
(Continued)

(51) Int. Cl.
*F03D 7/02* (2006.01)
*F03D 9/11* (2016.01)
(Continued)

(52) U.S. Cl.
CPC ......... *F03D 7/0224* (2013.01); *F03D 7/0264* (2013.01); *F03D 9/11* (2016.05);
(Continued)

(58) Field of Classification Search
CPC .... F03D 7/0224; F03D 7/0264; H02J 7/0042; H02J 7/345; H02J 2207/50; F05B 2260/42; F05B 2270/328
See application file for complete search history.

(56) References Cited

U.S. PATENT DOCUMENTS 11,073,130 B1 * 7/2021 Wilks ................... H02J 7/0042
11,193,471 B1 * 12/2021 Wilks ................... F03D 7/0224
(Continued)

FOREIGN PATENT DOCUMENTS

CN        203522313 U    4/2014
CN        107546830 A    1/2018
(Continued)

OTHER PUBLICATIONS

PCT Patent Application PCT/US2022/016960 International Preliminary Report on Patentability issued Aug. 22, 2023.

*Primary Examiner* — Pedro J Cuevas
(74) *Attorney, Agent, or Firm* — Erise IP, P.A.

(57) ABSTRACT

A pitch energy module comprising one or more ultracapacitors storing electrical energy for a wind turbine emergency pitch energy event. The pitch energy module replaces at least one battery within a battery housing of a wind turbine and interfaces with the existing battery wiring harness to communicate with a control system of the wind turbine. The pitch energy module is installed without further modification to the battery housing or the battery wiring harness.

20 Claims, 10 Drawing Sheets

Related U.S. Application Data continuation of application No. 17/338,926, filed on Jun. 4, 2021, now Pat. No. 11,193,471, which is a continuation of application No. 17/180,329, filed on Feb. 19, 2021, now Pat. No. 11,073,130.

(51) Int. Cl.
*H02J 7/00* (2006.01)
*H02J 7/34* (2006.01)

(52) U.S. Cl.
CPC ......... *H02J 7/0042* (2013.01); *F05B 2240/85* (2020.08); *F05B 2260/42* (2013.01); *F05B 2270/328* (2013.01); *F05B 2270/504* (2013.01); *H02J 7/345* (2013.01); *H02J 2207/50* (2020.01)

(56) References Cited

U.S. PATENT DOCUMENTS

| | | | | |
|---|---|---|---|---|
| 2003/0052645 A1* | 3/2003 | Sasaki | ................... | H02J 7/0063 |
| | | | | 320/112 |
| 2013/0176401 A1* | 7/2013 | Monari | ................... | H04N 23/00 |
| | | | | 348/157 |
| 2021/0363968 A1* | 11/2021 | Holliday, III | ......... | F03D 7/0264 |
| 2022/0065222 A1* | 3/2022 | Gauchel | ................ | F03D 7/0268 |

FOREIGN PATENT DOCUMENTS

| | | |
|---|---|---|
| DE | 10033029 A1 | 1/2002 |
| DE | 102014114787 A1 | 4/2016 |
| EP | 1748183 A2 | 1/2007 |

* cited by examiner

ULTRACAPACITOR PITCH ENERGY MODULE

RELATED APPLICATIONS

This patent application is a continuation application claiming priority benefit, with regard to all common subject matter, of U.S. patent application Ser. No. 17/541,495, filed Dec. 3, 2021, and entitled "ULTRACAPACITOR PITCH ENERGY MODULE" ("the '495 application"). The '495 application is a continuation application claiming priority benefit, with regard to all common subject matter, of U.S. patent application Ser. No. 17/338,926, filed Jun. 4, 2021, now U.S. Pat. No. 11,193,471, issued on Dec. 7, 2021, and entitled "ULTRACAPACITOR PITCH ENERGY MODULE" ("the '471 patent"). The '471 patent is a continuation application claiming priority benefit, with regard to all common subject matter, of U.S. patent application Ser. No. 17/180,329, filed Feb. 19, 2021, now U.S. Pat. No. 11,073,130, issued Jul. 27, 2021, and entitled "ULTRACAPACITOR PITCH ENERGY MODULE" ("the '130 patent"). The above-referenced patents are hereby incorporated by reference in their entirety into the present application.

BACKGROUND

1. Field

Embodiments of the invention relate to pitch energy storage systems for wind turbines. More specifically, embodiments of the invention relate to pitch energy modules employing ultracapacitors for storing electrical energy, wherein the pitch energy module replaces existing batteries within wind turbine pitch energy storage systems.

2. Related Art

Typically, wind turbines store energy for emergency pitch events within batteries mounted within a battery housing disposed within the wind turbine. However, batteries have a range of deficiencies such as slow charging and discharging times, as well as temperature dependence. Additionally, the lifetime of batteries may be limited to a certain number of charge cycles.

Ultracapacitors have been known as an alternative energy storage device for wind turbine emergency pitch energy events. Ultracapacitors have quicker charging and discharging times, operability for a range of temperatures, and suitability for significantly more charging cycles when compared with batteries. However, existing ultracapacitor pitch energy devices are also associated with a number of drawbacks. Typical ultracapacitor pitch energy devices require extensive modifications to the battery housing for installation, such as adapters and additional wiring harnesses, which increases the cost of installation. For example, typical ultracapacitor pitch energy devices cannot interface with the existing battery wiring harness.

Additionally, typical ultracapacitor pitch energy devices distribute a much lower equivalent series resistance when compared with that of batteries. Accordingly, placing ultracapacitor pitch energy devices in series with the existing batteries increases the electrical load on the batteries because of the disparity in the equivalent series resistance. As such, it is problematic if not entirely unfeasible to replace the existing batteries incrementally, i.e., have a mix of batteries and ultracapacitors in the pitch energy system, where the batteries are replaced as they become unusable. Therefore, administrators of wind turbines are frequently forced to replace all batteries with ultracapacitors, even though many of the batteries are still usable, adding increased cost.

Accordingly, what is needed is an ultracapacitor pitch energy module designed to replace at least one battery within a pitch energy system of a wind turbine without requiring additional installation modifications to the battery housing, battery harness, wind turbine control system, or other hardware or software associated with the wind turbine's pitch energy system. Further, the ultracapacitor pitch energy module should have an equivalent series resistance greater than or similar to that of the battery being replaced such that the module can be safely placed in series with existing batteries.

SUMMARY

Embodiments of the invention solve the above-mentioned problems by providing a pitch energy module for replacing at least one battery within an electric pitch energy system of a wind turbine. In some embodiments, the pitch energy module is mounted within a battery housing of the wind turbine and coupled to a battery wiring harness to thereby communicate with a control system of the wind turbine. In some embodiments, the pitch energy module is configured to provide electrical power from one or more ultracapacitors to the wind turbine during an emergency pitch event.

A first embodiment of the invention is directed to a pitch energy module for replacing at least one battery within an electric pitch control system of a wind turbine, the at least one battery mounted in the wind turbine in a battery housing and operably coupled with a control system of the wind turbine via at least a battery wiring harness, the pitch energy module comprising a pitch energy module housing sized for mounting in the battery housing upon replacement of the at least one battery with the pitch energy module, one or more ultracapacitors mounted within the pitch energy module housing, the one or more ultracapacitors configured to store electrical energy for a wind turbine emergency pitch event, a microprocessor mounted on or in the pitch energy module housing, the microprocessor processing a first set of information associated with the one or more ultracapacitors, a non-volatile memory communicatively coupled with the microprocessor for storing a second set of information associated with the pitch energy module, a communications adapter, mounted on or in the pitch energy module housing and communicatively coupled with the microprocessor, configured to interface with a battery communications cable of the battery wiring harness to thereby transfer at least one signal comprising the first set of information associated with the one or more ultracapacitors to the control system of the wind turbine, and a charger mounted on or in the pitch energy module housing for electrically charging the one or more ultracapacitors.

A second embodiment of the invention is directed to a pitch energy module for replacing a battery within an electric pitch control system of a wind turbine, the battery mounted in the wind turbine in a battery housing and operably coupled with the wind turbine's control system via at least a battery wiring harness, the pitch energy module comprising a pitch energy module housing sized for mounting in the battery housing upon replacement of the battery with the pitch energy module, one or more ultracapacitors mounted within the pitch energy module housing, the one or more ultracapacitors configured to store electrical energy for a wind turbine emergency pitch event, a microprocessor mounted on or in the pitch energy module housing, the microprocessor for processing a first set of information associated with the one or more ultracapacitors, a non-volatile memory communicatively coupled with the microprocessor for storing a second set of information associated with the pitch energy module, a positive terminal electrically coupled to the one or more ultracapacitors, the positive terminal comprising a first bolt fastener, a negative terminal electrically coupled to the one or more ultracapacitors, the negative terminal comprising a second bolt fastener, wherein the battery comprises a first equivalent series resistance, wherein the first bolt fastener and the second bolt fastener achieve a second equivalent series resistance for the one or more ultracapacitors that is higher than the first equivalent series resistance of the battery, a communications adapter, mounted on or in the pitch energy module housing and communicatively coupled with the microprocessor, configured to interface with a battery communications cable of the battery wiring harness to thereby transfer at least one signal comprising the first set of information associated with the one or more ultracapacitors to the control system of the wind turbine, and a charger mounted on or in the pitch energy module housing for electrically charging the one or more ultracapacitors.

A third embodiment of the invention is directed to a pitch energy system for replacing at least one battery within an electric pitch control system of a wind turbine, the at least one battery mounted in the wind turbine in a battery housing and operably coupled with the wind turbine's control system via at least a battery wiring harness, the pitch energy system comprising a plurality of pitch energy modules electrically connected in series, each of the plurality of pitch energy modules comprising a pitch energy module housing sized for mounting in the battery housing upon replacement of the at least one battery, one or more ultracapacitors mounted within the pitch energy module housing, the one or more ultracapacitors configured to store electrical energy for a wind turbine emergency pitch event, a microprocessor mounted on or in the pitch energy module housing, the microprocessor processing a first set of information associated with the one or more ultracapacitors, a non-volatile memory communicatively coupled with the microprocessor for storing a second set of information associated with the pitch energy module, a communications adapter, mounted on or in the pitch energy module housing and communicatively coupled with the microprocessor, configured to interface with a battery communications cable of the battery wiring harness to thereby transfer at least one signal comprising the first set of information associated with the one or more ultracapacitors to the control system of the wind turbine, and a charger mounted on or in the pitch energy module housing for electrically charging the one or more ultracapacitors.

A fourth embodiment of the invention is directed to a method of use of a pitch energy module for replacing at least one battery in an electric pitch control system of a wind turbine, the method comprising the steps of charging a plurality of ultracapacitors mounted within a pitch energy module housing of the pitch energy module, storing electrical energy within the plurality of ultracapacitors, transmitting a first signal comprising information associated with the plurality of ultracapacitors to a control system of the wind turbine, and supplying electrical energy from the plurality of ultracapacitors to a plurality of motors within the wind turbine during an emergency pitch event to adjust the pitch of the wind turbine blades.

A fifth embodiment of the invention are directed to a method for replacing a battery within an electric pitch control system of a wind turbine with a pitch energy module, the method comprising the steps of disconnecting a battery wiring harness from the battery, removing the battery from a battery housing of the wind turbine, mounting the pitch energy module in the battery housing, and connecting the battery wiring harness to the pitch energy module.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
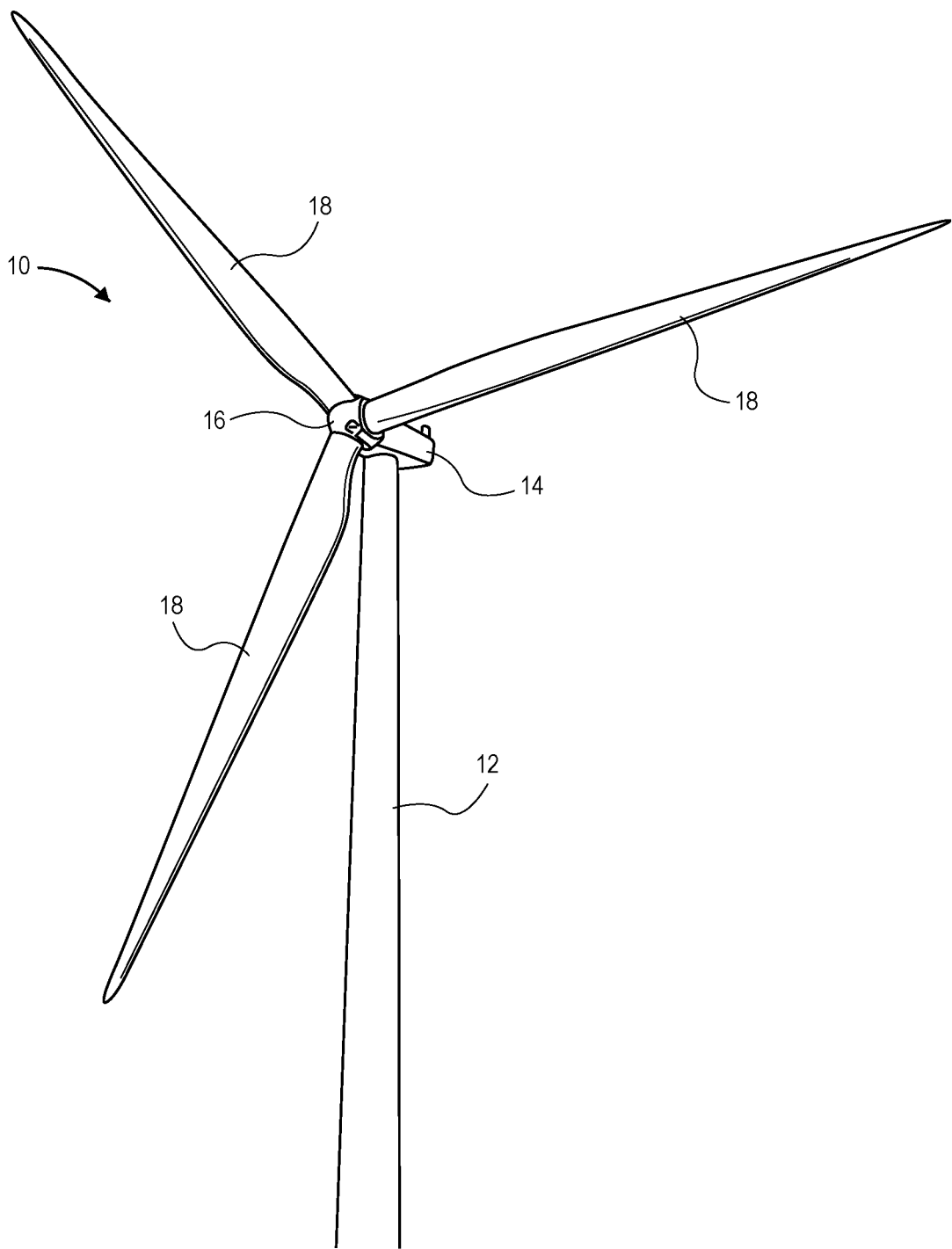
FIG. 1 depicts a wind turbine relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Wind turbines harvest renewable energy from the wind using a plurality of blades attached to a rotor to drive rotation of the rotor and convert the energy into electrical energy by turning a generator. In some cases, it may be desirable to adjust the pitch of the blades of the wind turbine. For example, during a wind turbine emergency pitch event, stored electrical energy may be supplied to motors within the wind turbine to disengage the blades. Here, the blades may be rotated at a 90 degree angle such that they are perpendicular to the wind and decrease the rotational velocity of the rotor or prevent the rotor from turning. In some embodiments, it may be desirable to adjust the pitch of the blades when a safety critical fault is experienced by the wind turbine to reduce the rotational velocity of the blades and rotor. Additionally, it may be desirable to adjust the pitch of the blades when a grid event is experienced where power is lost to the entire grid. Here, it is desirable to disengage the blades using backup power before power to the turbine control system is completely lost.

Embodiments of this disclosure provide a pitch energy module for replacing at least one battery within an electric pitch control system of a wind turbine. In some embodiments, the pitch energy module is configured to interface with the existing installation system intended for the battery such that installation time and cost is reduced. Further, embodiments of the invention provide a pitch energy module with an equivalent series resistance that is similar to that of a battery such that the pitch energy module may be used in the pitch control system in tandem with existing batteries. Accordingly, embodiments are contemplated where batteries may be replaced incrementally with pitch energy modules, as needed.

Turning first to FIG. 1, a wind turbine 10 is depicted relating to some embodiments of the invention. In some embodiments, the wind turbine 10 comprises a tower 12 extending vertically and supporting a nacelle 14. In some embodiments, a generator and a controller of the wind turbine 10 are housed within the nacelle 14. Additionally, the wind turbine 10 further comprises a rotor 16 rotatably secured to the nacelle 14. The rotor 16 supports a plurality of blades 18 extending radially outwards from the rotor 16. For example, in some embodiments, the wind turbine 10 comprises three blades 18, as shown. In some embodiments, each of the blades 18 is rotatably secured to the rotor 16 via a slew ring bearing.

In some embodiments, a plurality of motors are disposed within the rotor 16 for rotating the blades 18 with respect to the rotor 16 to thereby adjust the pitch of the blades 18. In some embodiments, it may be desirable to adjust the pitch of the blades 18 during an emergency pitch event of the wind turbine 10 or to test the pitch system of the wind turbine 10. Here, an emergency pitch event may occur when at least one power source has been cut off from the wind turbine 10. Additionally, an emergency pitch event may occur when a maximum rotational velocity of the rotor 16 has been exceeded. When an emergency pitch event occurs, energy is employed from an emergency pitch system of the wind turbine 10 to drive the motors and thereby adjust the pitch of the blades 18 such that the blades 18 are positioned perpendicular to the direction of the wind. Accordingly, the blades 18 are disengaged and the rotational velocity of the rotor 16 is reduced. In some embodiments, a large amount of energy may be used over a short period of time to adjust the pitch of the blades 18. Accordingly, ultracapacitors may be better suited to store and supply said energy when compared with traditional batteries.

Figure 2A:
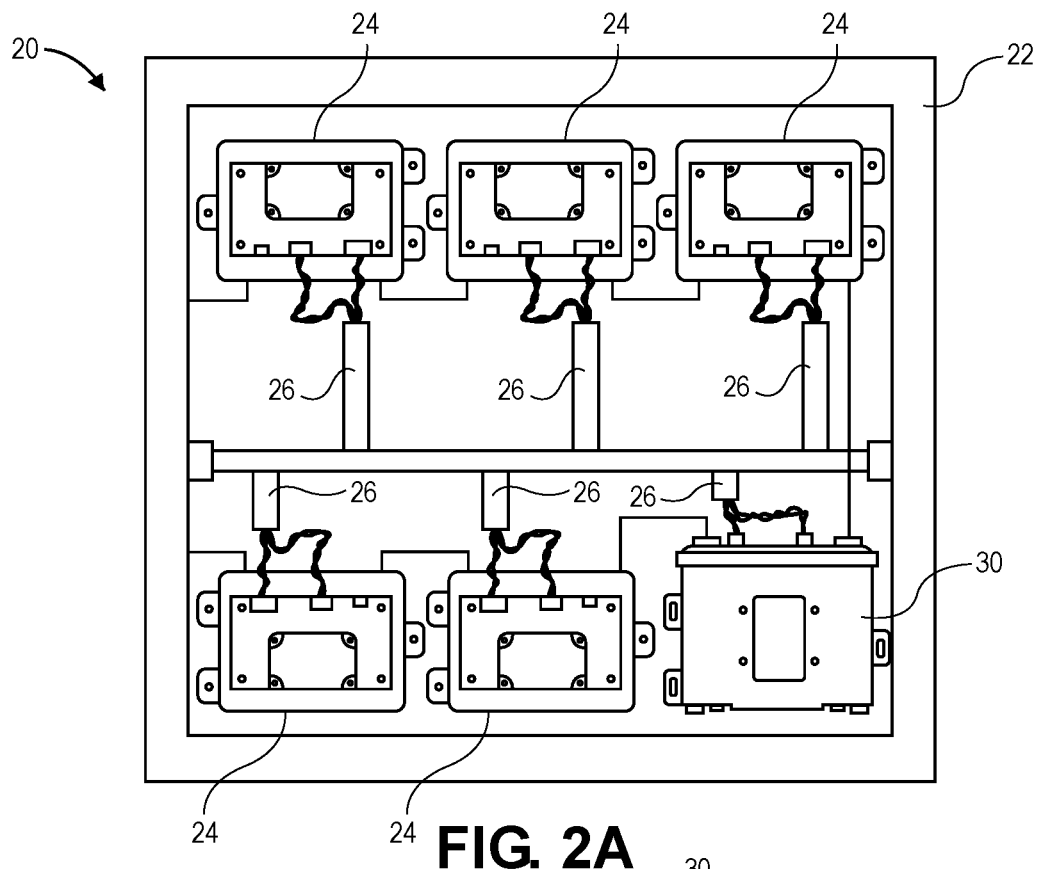
FIG. 2A depicts a battery housing relating to some embodiments of the invention.

Turning now to FIG. 2A, a battery housing 20 is depicted relating to some embodiments of the invention. The battery housing 20 may be disposed within the rotor 16 of the wind turbine 10 where the rotor 16 is attached to each of the blades 18. Accordingly, a plurality of battery housings 20 may be disposed within a single rotor 16 at the connection point of each respective blade 18. For example, a wind turbine 10 with three blades 18 may comprise three battery housings 20. In some embodiments, the battery housing 20 may be secured to an internal wall of the rotor 16 adjacent to the slew ring connecting the rotor 16 to the blade 18. In some embodiments, the battery housing 20 comprises a frame 22 for securing a plurality of batteries 24. In some such embodiments, the frame 22 may be composed of stainless steel sheet metal, aluminum sheet metal, hard plastic, fiberglass, or another suitable material.

In some embodiments, each of the batteries 24 may be removably mounted within the frame 22 using bolts or another suitable fastener. Further, the batteries 24 may be coupled to a control system of the wind turbine 10 using a battery wiring harness 26. Here, each battery wiring harness 26 comprises a plurality of cables electrically connected to ports and terminals on the battery. For example, each battery 24 may comprise a communications port, an external power input port, a positive terminal, and a negative terminal. Accordingly, the battery wiring harness 26 may be operable to transmit communication signals between the battery 24 and the control system of the wind turbine 10. Further, the positive and negative terminals of the battery may be used to transfer electrical energy stored within the battery 24 to the motors of the wind turbine 10 during an emergency pitch event. In some embodiments, the batteries 24 are electrically connected in series, as shown, with the positive terminal of one battery wired connected to the negative terminal of the next battery using a cable of the battery wiring harness 26. Further, it should be understood that, in some embodiments, each of the batteries 24 is coupled with an external battery charger for charging the battery 24. Here, the external battery charger may be disposed within the battery housing 20.

The battery housing 20, as shown in FIG. 2A, comprises a pitch energy module 30 mounted within the battery housing 20. For example, the pitch energy module 30 may be bolted to the frame 22 of the battery housing 20. In some embodiments, the pitch energy module 30 is coupled to the control system of the wind turbine 10 using the battery wiring harness 26 in a similar fashion to the batteries 24, as will be discussed in detail below. In some such embodiments, it may be desirable that the pitch energy module 30 is mounted within the battery housing 20 and connected with the battery wiring harness 26 in the same way as the batteries 24. Accordingly, the pitch energy module 30 may replace one of the batteries 24 and the corresponding battery charger without requiring additional modifications to the battery housing 20 or the battery wiring harness 26. Similarly, in some embodiments, the pitch energy module 30 is mounted within the battery housing 20 without additional mounting means or structural modification to the battery housing 20. Further, it should be understood that, in some embodiments, the pitch energy module 30 is operable to interface with the control system of the wind turbine 10 without modifying software of the control system. Accordingly, the pitch energy module 30 may be configured to communicate the same types of signals with the control system as the battery 24 being replaced.

In some embodiments, the pitch energy module 30 replaces a single battery and battery charger. For example, a pitch energy system that previously had six batteries may replace one of the batteries 24 such that there are five batteries and one pitch energy module 30, as shown. Alternatively, in some embodiments, the pitch energy module 30 may replace a plurality of batteries within the battery housing 20. For example, in some embodiments, one pitch energy module 30 may replace two or more batteries 24 within the battery housing 20. In some embodiments, it may be desirable to replace batteries 24 within the battery housing 20 incrementally such that one battery is replaced at a time while other batteries are not replaced to thereby operate with varying ages and wear of batteries, as will be discussed in further detail below. Accordingly, the pitch energy module 30 may be installed within the battery housing as needed. For example, a battery 24 may be replaced with a pitch energy module 30 when the battery 24 has exceeded its useful lifetime or when the battery 24 has become faulty. As such, embodiments are contemplated where an unstable battery is replaced with the pitch energy module 30 while other stable batteries 24 remain in the battery housing 20.

In some embodiments, during a pitch energy event, energy stored within the batteries 24 and the pitch energy module 30 is used to drive the motors and thereby pitch the blades 18 of the wind turbine 10. It should be understood that embodiments are contemplated where any number of batteries and pitch energy modules 30 are mounted within the battery housing 20.

Figure 2B:
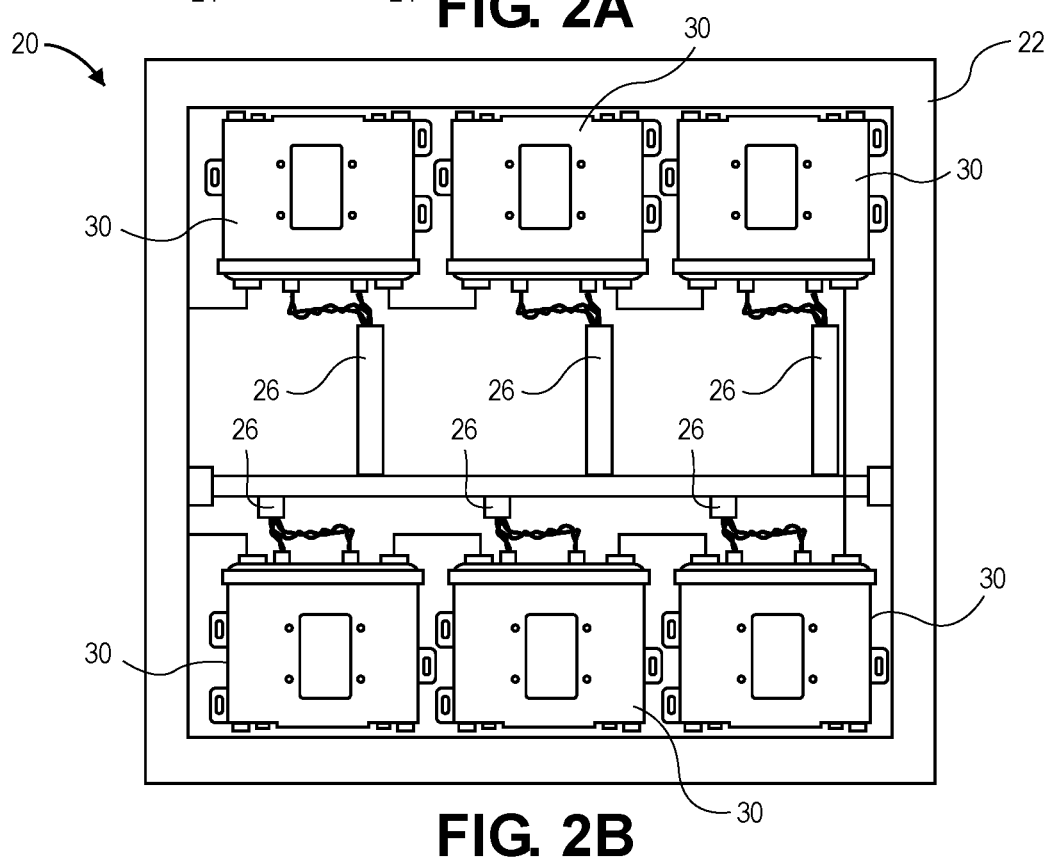
FIG. 2B depicts a battery housing relating to some embodiments of the invention.

Turning now to FIG. 2B, the battery housing 20 is depicted with a plurality of pitch energy modules 30 relating to some embodiments of the invention. Here, each battery 24 and battery charger within the battery housing 20 is replaced with a corresponding pitch energy module 30. Each of the pitch energy modules 30 is mounted within the battery housing 20 and coupled to the control system of the wind turbine 10 via a respective battery wiring harness 26. One advantageous feature of embodiments of the invention is that the pitch energy module uses the existing battery harness 26 to both structurally and communicatively mount and couple the pitch energy module (and any included components, as discussed below) within the battery housing 20. As such, no additional communication cables, structural supports, mounting brackets or hardware, or other communication or mounting components—other than the battery wiring harness 26—is needed to mount the pitch energy module and have it communicate with the control system of the wind turbine. Here, the pitch energy modules 30 may be electrically connected in series, as shown, using cables of the battery wiring harness 26 to wire the positive terminal of one pitch energy module 30 to a negative terminal of the next pitch energy module 30.

It should be understood that various other configurations within the battery housing 20 are also contemplated. For example, the battery housing 20 may hold six pitch energy modules 30, as shown, or may hold four pitch energy modules 30. Further, the mounting positions of the pitch energy modules 30 may be adjusted within the battery housing 20. For example, the pitch energy modules 30 may be mounted on a top and bottom row within the battery housing 20, as shown, but may also be mounted on the sides and may be mounted in a different orientation. In some embodiments, the number of pitch energy modules 30 and the mounting positions within the battery housing 20 may be determined based on the type of wind turbine 10. For example, a smaller wind turbine 10 may require less power to perform a pitch adjustment and only needs four pitch energy modules 30 within the battery housing 20 for each blade 18.

Figure 3A:
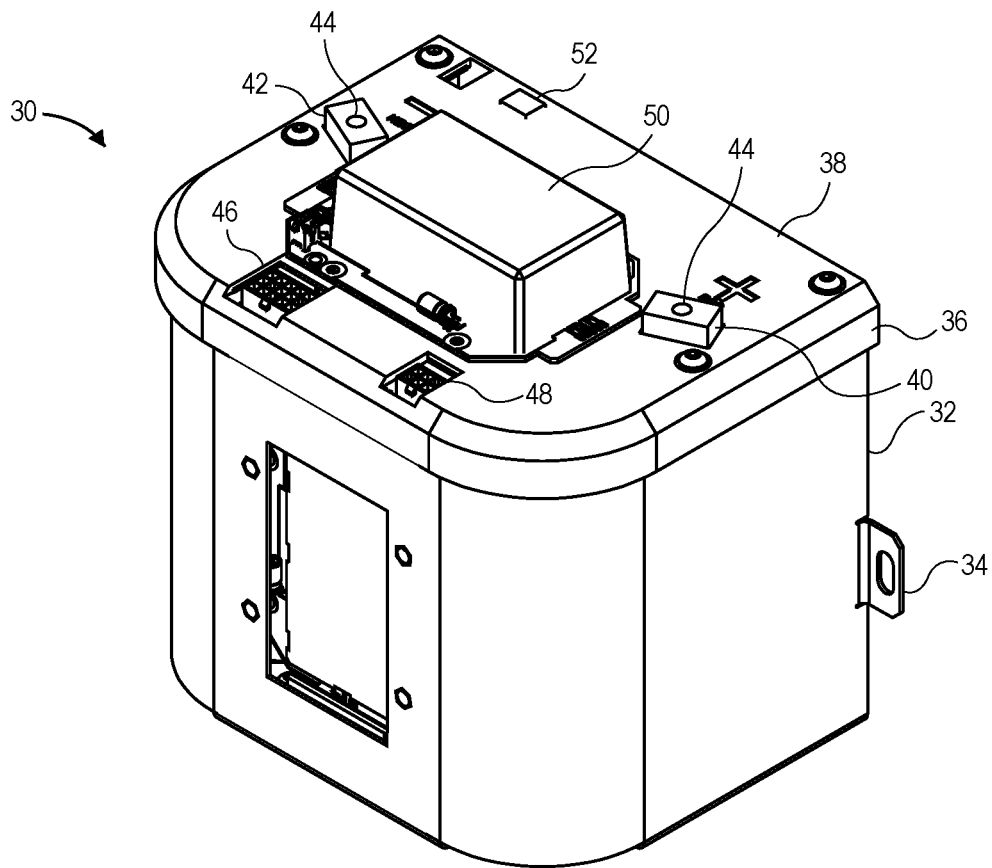
FIG. 3A depicts an isometric view of a pitch energy module relating to some embodiments of the invention.

Turning now to FIG. 3A, an isometric view of a pitch energy module 30 is depicted relating to some embodiments of the invention. Here, the pitch energy module 30 comprises a pitch energy module housing 32, which may be composed of sheet metal, hard plastic, fiberglass, or another suitable rigid material. In some embodiments, mounting brackets 34 are secured to the edges of the pitch energy module housing 32. Accordingly, the mounting brackets 34 may be used to mount the pitch energy module 30 to the frame 22 within the battery housing 20. In some embodiments, the mounting brackets 34 comprise slotted holes configured to receive a bolt to thereby adjustably secure the pitch energy module 30 within the battery housing 20.

The pitch energy module 30 further comprises a circuit board 36 mounted on the pitch energy module housing 32. For example, the circuit board 36 may be mounted on top of the pitch energy module 30, as shown. In some embodiments, it may be desirable to include a protective cover 38 placed over the circuit board 36 to protect the circuit board 36 from physical damage, dust, and weathering. Here, the protective cover 38 may be composed of fiberglass, glass, hard plastic, or another rigid material. Further, in some embodiments, the protective cover 38 may be transparent such that the circuit board 36 is visible beneath the protective cover 38. In yet further embodiments, the circuit board 36 may be mounted in an interior of the pitch energy module 30.

The pitch energy module 30 further comprises a positive terminal 40 and a negative terminal 42 mounted on the circuit board 36. In some embodiments, the terminals 40 and 42 protrude from the protective cover 38, as shown, such that the terminals are accessible for connection to the battery wiring harness 26. In some embodiments, direct current (DC) power is provided at the terminals 40 and 42 of the pitch energy module 30 for driving the motors of the wind turbine 10 to adjust the pitch of the blades 18. Additionally, in some embodiments, each of the positive terminal 40 and the negative terminal 42 comprises a bolt fastener 44 for electrically and mechanically coupling a respective cable of the battery wiring harness 26 to the terminal. Here, the terminals 40 and 42 may comprise a threaded hole for receiving the bolt fasteners 44. In some embodiments, using the bolt fasteners 44 increases an equivalent series resistance associated with the pitch energy module 30, as will be discussed below.

In some embodiments, the pitch energy module 30 further comprises a communications adapter 46 configured to be coupled to a communications cable of the battery wiring harness 26 to thereby transmit communications with the wind turbine 10. Here, the communications adapter 46 may be operable to both transmit and receive communications signals with the control system of the wind turbine 10. In some embodiments, the communications adapter 46 comprises a 15-pin connection port, as shown, for receiving/transmitting communications using 15 different wires of the battery wiring harness 26. Alternatively, in some embodiments, different types of connection ports may be used. Further, in some embodiments, the pitch energy module 30 comprises an external power input 48. For example, the external power input 48 may be configured to be coupled to a power cable of the battery wiring harness 26 to receive electrical energy for powering the pitch energy module 30. In some embodiments, the external power input 48 is an alternating current (AC) power input for receiving AC power from an AC source. In some embodiments, the external power input 48 may comprise a 6-pin connection port, as shown.

Figure 4A:
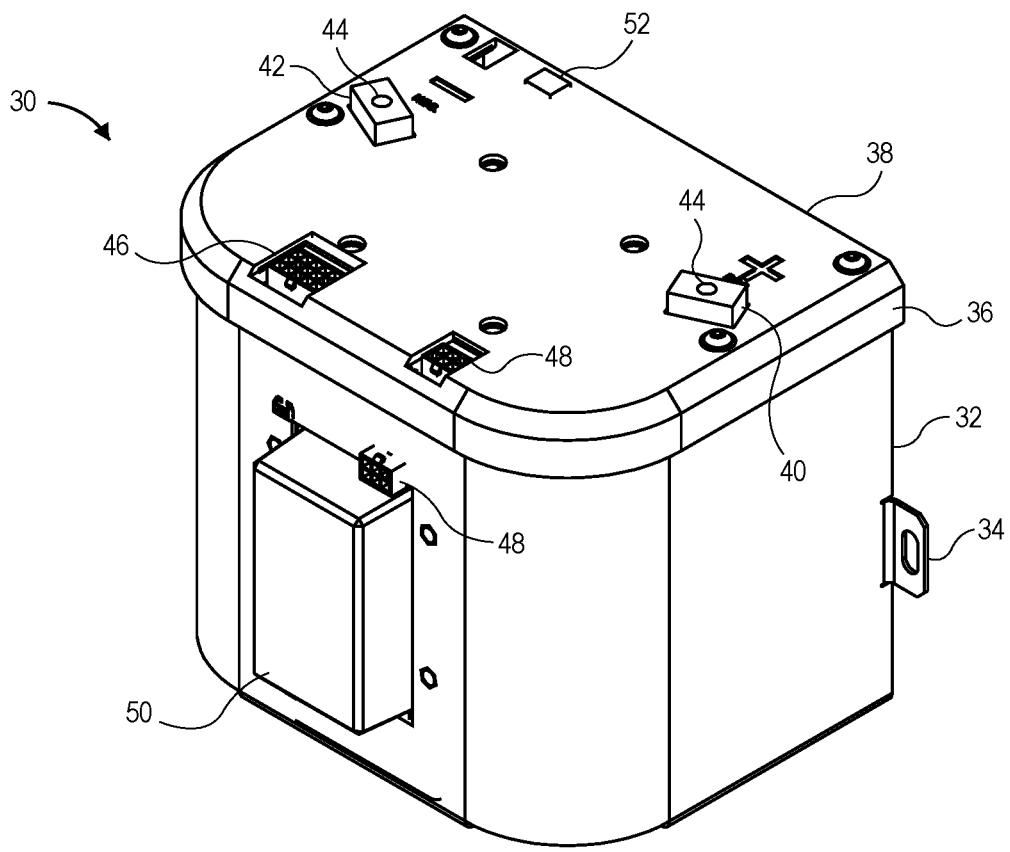
FIG. 4A depicts an isometric view of a pitch energy module relating to some embodiments of the invention.
Figure 4B:
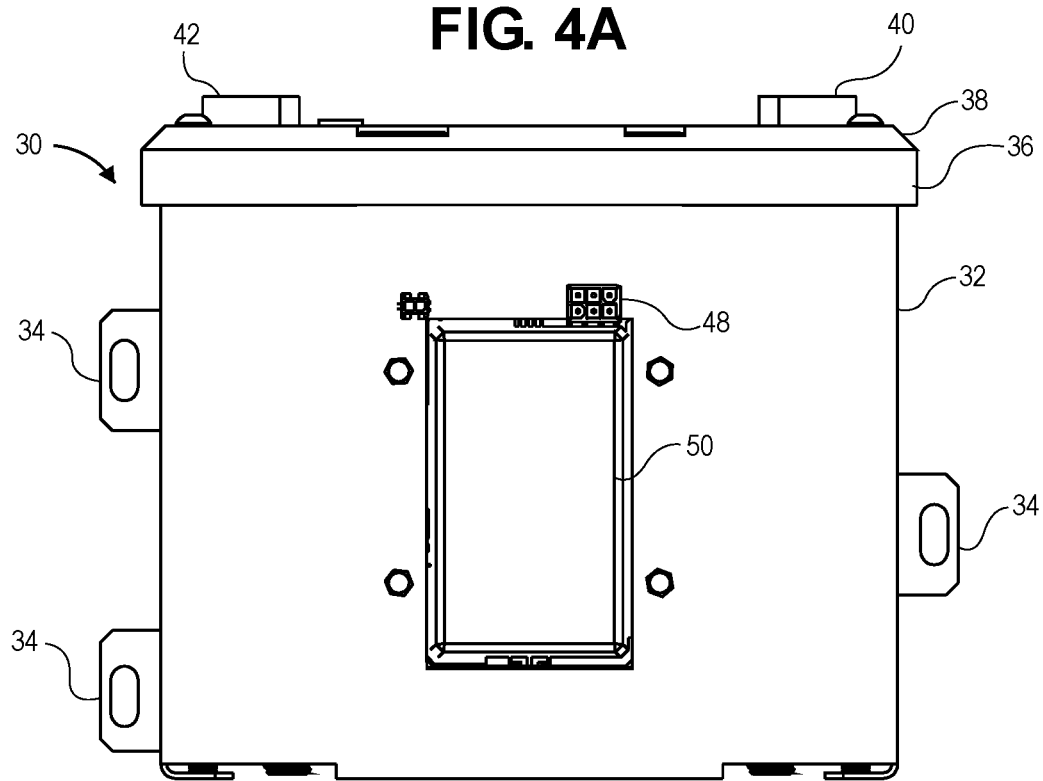
FIG. 4B depicts a front view of a pitch energy module relating to some embodiments of the invention.

In some embodiments, the pitch energy module 30 further comprises a built in charger 50 mounted on the pitch energy module housing 32. In some embodiments, the charger 50 may be mounted on top of the pitch energy module 30 above the protective cover 38, as shown. Alternatively, in some embodiments, the charger 50 may be mounted on a front facing side of the pitch energy module 30, as shown in FIGS. 4A and 4B. In some embodiments, it may be desirable that the charger 50 is selectably mounted on the pitch energy module 30 in a specific location based on a configuration of the wind turbine 10. For example, in some embodiments, the charger 50 may be mounted on the front facing side of the pitch energy module 30 such that the pitch energy module 30 fits into a specific location within the battery housing 20. It should be understood that different types of wind turbines may comprise battery housings with various different shapes and sizes. Accordingly, it may be desirable that the mounting position of the charger 50 on the pitch energy module 30 is adjustably selectable to fit within the battery housing 20.

In some embodiments, the charger 50 is held at a floating voltage potential of the pitch energy module 30. Accordingly, the size of the charger 50 may be reduced as compared to a charger requiring its own electrical grounding system and the charger 50 may be disposed on the pitch energy module 30. Here, the charger 50 may not comprise an electrical ground to earth but has a floating ground. Thus, the charger 50 may be grounded with respect to the pitch energy module 30.

In some embodiments, the pitch energy module 30 further comprises a microprocessor 52 mounted on the circuit board 36 for processing information associated with the pitch energy module 30 such as, for example, information relating to one or more ultracapacitors mounted within the pitch energy module 30.

Figure 3B:
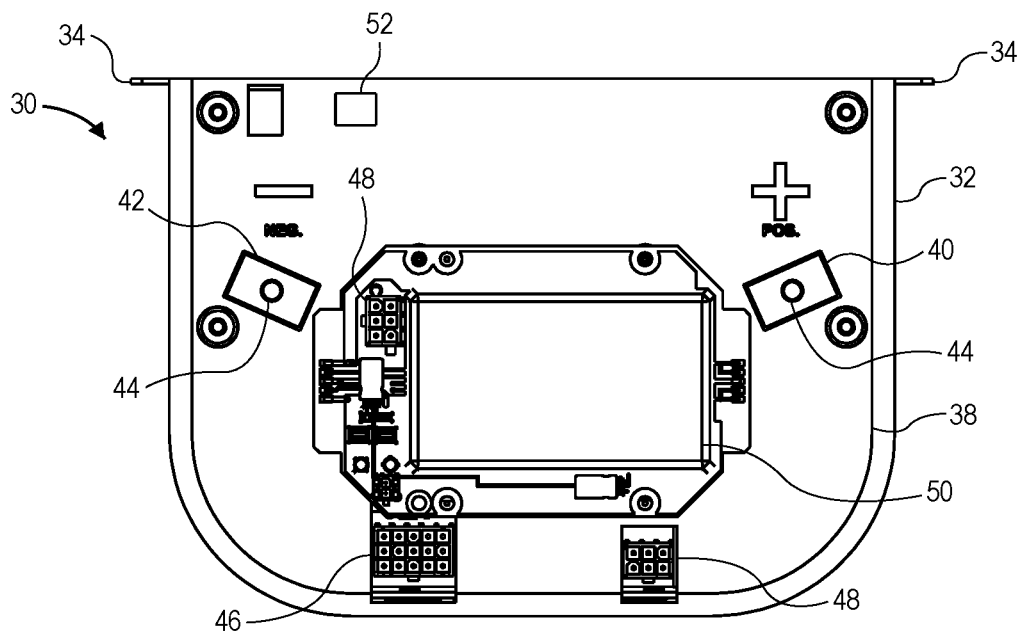
FIG. 3B depicts a top view of a pitch energy module relating to some embodiments of the invention.

Turning now to FIG. 3B, a top view of the pitch energy module 30 is depicted relating to some embodiments of the invention. In some embodiments, the charger 50 comprises an additional external power input 48. Here, it may be desirable to use the external power input 48 mounted on the charger 50 and not the external power input 48 mounted on the circuit board 36. Further, in some embodiments, the charger 50 may comprise a charger circuit board which may be communicably coupled with the circuit board 36 of the pitch energy module 30. Additionally, in some embodiments, the charger is mounted on top of the pitch energy module 30, as shown.

Figure 3C:
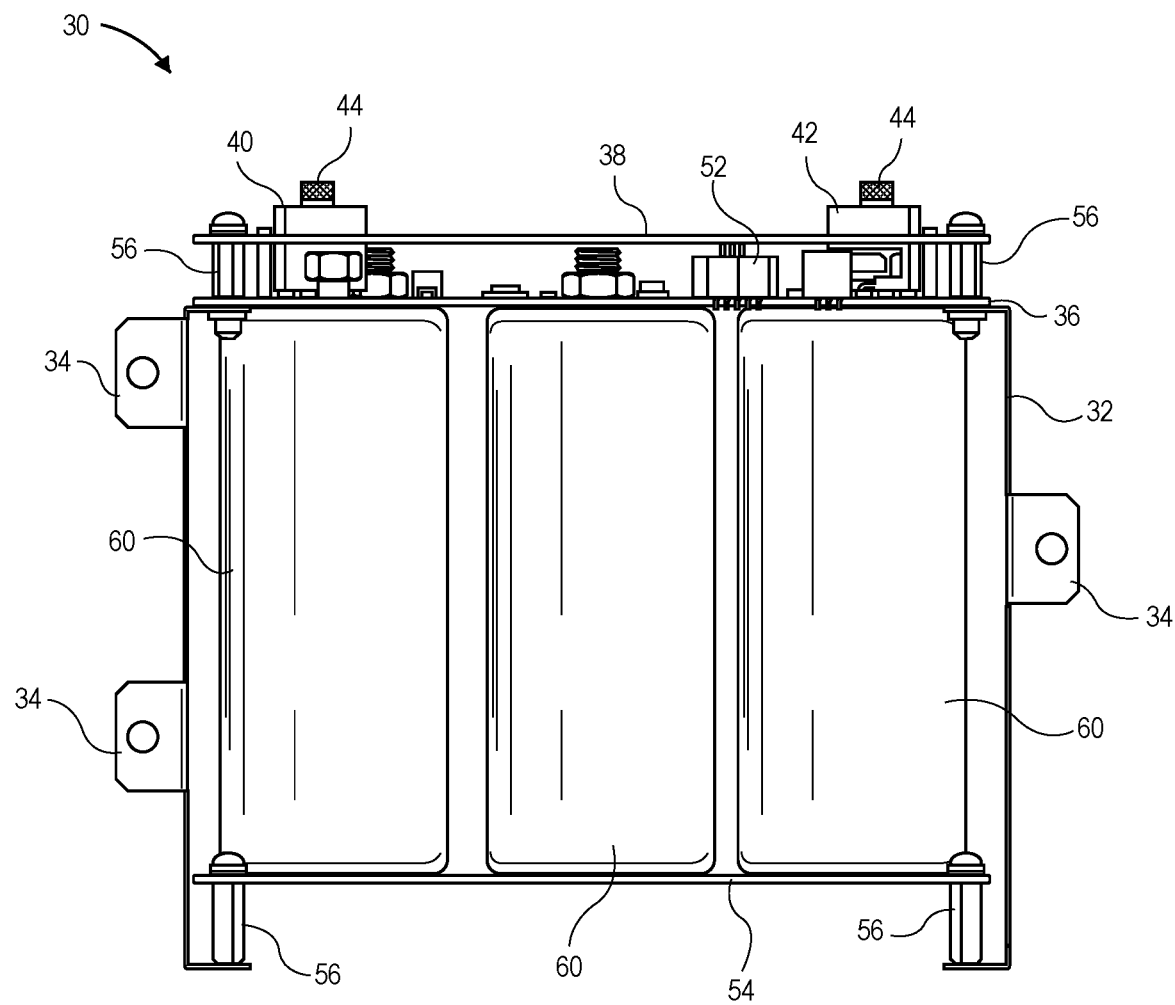
FIG. 3C depicts a rear view of a pitch energy module relating to some embodiments of the invention.

Turning now to FIG. 3C, a rear view of the pitch energy module 30 is depicted relating to some embodiments of the invention. Here, the pitch energy module 30 may be opened such that the internals of the pitch energy module housing 32 are visible. Accordingly, a second internal circuit board 54 is visible mounted at the bottom of the pitch energy module 30 inside the pitch energy module housing 32. In some embodiments, the second internal circuit board 54 may be mounted within the pitch energy module housing 32 spaced from the bottom using spacers 56, as shown. Additionally, in some embodiments, spacers 56 may be disposed between the circuit board 36 and the protective cover 38 to create a gap between the circuit board 36 and the protective cover 38. In some embodiments, it may be desirable to include a gap between the circuit board 36 and the cover 38 to permit airflow to thereby reduce heating on the circuit board 36 and to allow space for components to be mounted on the circuit board 36.

In some embodiments, the pitch energy module 30 comprises at least one ultracapacitor 60 disposed within the pitch energy module housing 32, as shown. In FIG. 3C three ultracapacitors 60 are shown, though it should be understood that additional ultracapacitors may be included which are not visible. For example, in some embodiments, six ultracapacitors 60 may be disposed in each pitch energy module 30. Alternatively, in some embodiments, a single ultracapacitor 60 may be disposed within each pitch energy module 30. The ultracapacitors 60 are configured to store electrical energy to be used during an emergency pitch event of the wind turbine 10. Here, stored energy within the ultracapacitors 60 is transmitted to the motors of the wind turbine 10 through the connection with the battery wiring harness 26. In some embodiments, each of the ultracapacitors 60 comprises one of an electrostatic double-layer capacitor, an electrochemical pseudocapacitor, or a hybrid capacitor. Here, a hybrid capacitor may utilize both electrostatic and electrochemical energy storage techniques.

In some embodiments, it may be desirable to store electrical energy within the ultracapacitors 60 such that a large amount of energy is quickly available. Further, the ultracapacitors 60 of the pitch energy modules 30 may be better suited for periodically storing and releasing large amounts of energy used for the emergency pitch events when compared with the batteries 24.

In some embodiments, the positive terminal 40 and the negative terminal 42 protrude from the protective cover 38, as shown. Here, spaces may be cut out of the protective cover 38 such that the terminals 40 and 42 are accessible. Further, the terminals 40 and 42 comprise the bolt fasteners 44, as described above. The bolt fasteners 44 may be used to secure a cable from the battery wiring harness 26 to each of the terminals 40 and 42. In some embodiments, the terminals 40 and 42 are electrically coupled to the ultracapacitors 60. For example, the ultracapacitors 60 may be electrically connected in series. Here, the terminals of each ultracapacitor 60 may be electrically coupled to one of the circuit board 36 or the second internal circuit board 54. Here, the plurality of ultracapacitors 60 may be sandwiched between the circuit boards 36 and 54, as shown.

In some embodiments, the pitch energy module 30 comprises at least three mounting brackets 34, as shown. Here, the mounting brackets 34 may be positioned on the pitch energy module housing 32 corresponding to mounting brackets of a battery 24 being replaced such that the same bolts and mounting holes of the battery housing 20 may be used to mount the pitch energy module 30 in place of the battery 24. Accordingly, the pitch energy module 30 may replace the battery 24 without requiring additional mounting accommodations. Further, the mounting brackets 34 may be staggered on each side of the pitch energy module housing 32. For example, the mounting brackets 34 on one side of the pitch energy module housing 32 may be positioned differently than the mounting bracket 34 on the other side, as shown. Accordingly, space is saved within the battery housing 20 because the mounting brackets 34 may be placed in line with mounting brackets of another pitch energy module without interfering.

Figure 3D:
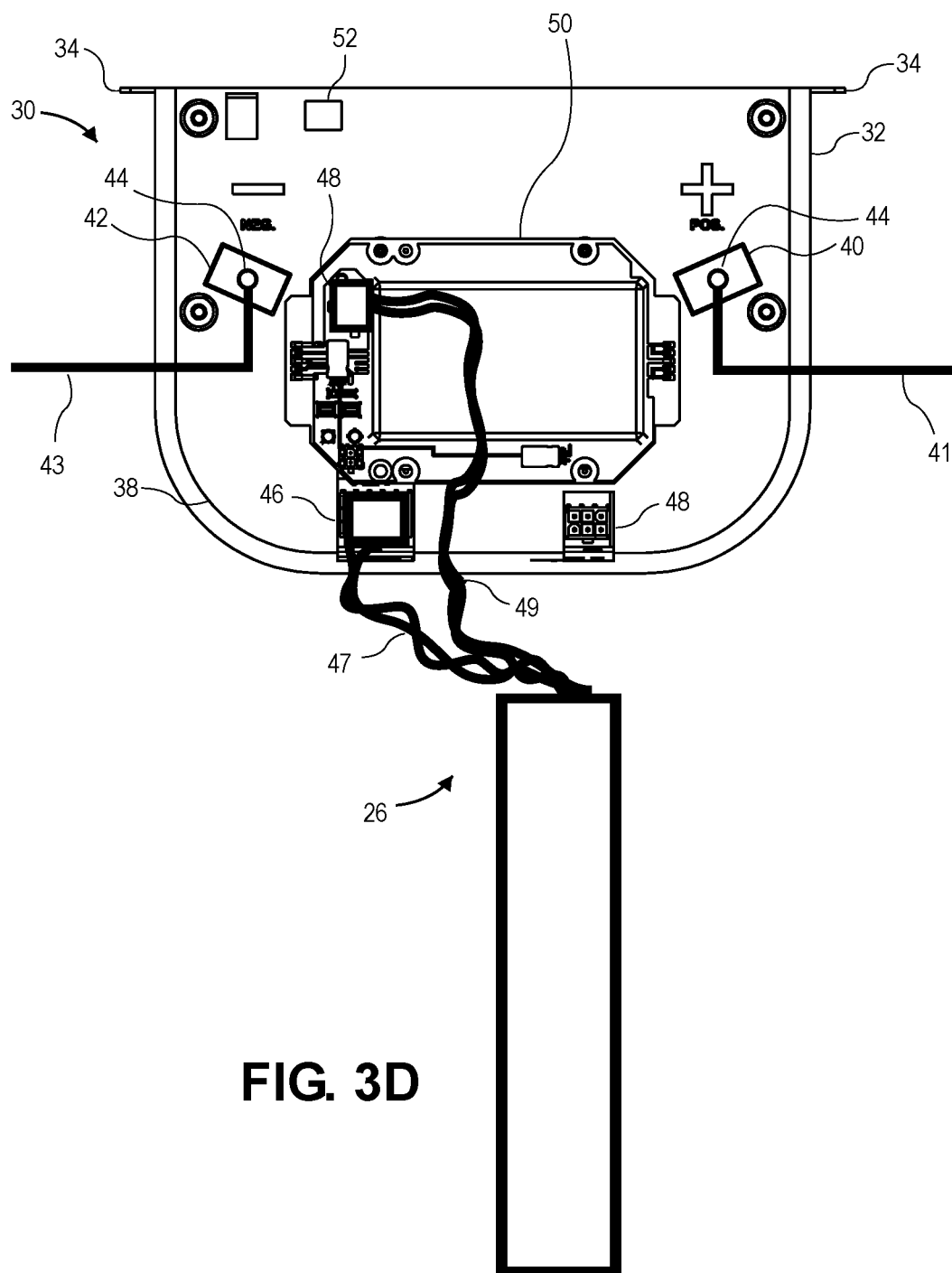
FIG. 3D depicts a top view of a pitch energy module interfacing with a battery wiring harness relating to some embodiments of the invention.

Turning now to FIG. 3D, a top view of the pitch energy module 30 interfacing with the battery wiring harness 26 is depicted relating to some embodiments of the invention. Here, the battery wiring harness 26 may comprise a plurality of cables configured to connect to various ports and terminals of the battery 24. In some embodiments, the battery wiring harness 26 comprises a positive terminal cable 41 configured to connect to a positive terminal of the battery 24, a negative terminal cable 43 configured to connect to a negative terminal of the battery 24, a communications cable 47 configured to connect to a communications adapter of the battery 24, and an AC input cable 49 configured to connect to an external power input of the battery 24. In some embodiments, each of the positive terminal cable 41 and the negative terminal cable 43 comprises a jumper wire. For example, a 6 AWG wire may be used to electrically couple to the terminals.

In some embodiments, the battery 24 is replaced with the pitch energy module 30, as shown. Here, the positive terminal cable 41 is connected to the positive terminal 40 of the pitch energy module 30. For example, the positive terminal cable 41 may be secured to the positive terminal 40 using the bolt fastener 44. In some embodiments, the positive terminal cable 41 connects to a negative terminal of another pitch energy module 30 such that the pitch energy modules are electrically connected in series. Alternatively, the positive terminal cable 41 may be electrically grounded at the other end of the cable. Similarly, the negative terminal cable 43 is connected to the negative terminal 42 of the pitch energy module 30, as shown, using the bolt fastener 44. At the other end of the negative terminal cable 43 the cable may be connected to a positive terminal of another pitch energy module 30 or to a power source of the wind turbine 10. Additionally, in some embodiments, the communications cable 47 may be plugged into the communications adapter 46 of the pitch energy module 30. Here, in some embodiments, the communications cable 47 may comprise a 15-pin connector for interfacing with the communications adapter 46. Similarly, the AC input cable 49 may be connected to the external power input 48 of the pitch energy module 30. Alternatively, in some embodiments, the AC input cable 49 may be plugged into the external power input 48 of the charger 50, as shown, depending on the configuration of the battery housing 20. For example, in some embodiments, when the pitch energy module 30 comprises a top mounted charger 50, the external power input 48 of the charger 50 is used instead of the external power input 48 of the pitch energy module 30. Accordingly, the pitch energy module 30 is attached to the battery wiring harness 26 of the battery housing 20 using cables 41, 43, 47, and 49 intended to be connected to the battery 24.

In some embodiments, the pitch energy module 30 comprises an AC input voltage within a range of 85-305 Volts. Further, in some embodiments, the pitch energy module 30 comprises an AC input protection device such as a fuse rated for 2.5 Amps at 250 Volts. In some embodiments, the charge voltage may be provided by the charger 50 at around 14 Volts DC. However, it should be understood that a variety of different voltage and current parameters are contemplated for the pitch energy module 30. In some embodiments, the pitch energy module 30 may be fully charged in under 35 minutes using the charger 50. Additionally, in some embodiments, the DC output voltage of the pitch energy module 30 may be adjustably selected between 12 Volts and 16 Volts. In some embodiments, the output voltage may be adjusted by 0.5 Volt increments.

In some embodiments, it may be desirable to adjust the voltage set-point of the pitch energy module 30 to increase the lifetime of the ultracapacitors 60. Accordingly, it may be desirable to allow an operator to selectably adjust the operating voltage of the pitch energy module 30. Here, the voltage set-point may be adjusted by one of a manual voltage adjustment device, such as a potentiometer, or a software command. It should be understood, that in some cases the capacity of the ultracapacitors drops over time. As the drop in capacity becomes noticeable, it may be desirable to increase the voltage set-point to increase the electrical capacity to thereby increase the lifetime of the ultracapacitors 60. Additionally, in some embodiments, the pitch energy module 30 comprises a wider range of operating temperatures when compared to the battery 24. For example, the pitch energy module 30 may comprise a rated operating temperature range between −40 to 65° C. Accordingly, the pitch energy module 30 is better suited for a variety of environments where wind turbines may be installed.

Turning now to FIG. 4A, a pitch energy module 30 with a front mounted charger 50 is depicted relating to some embodiments of the invention. Here, the charger 50 is mounted on the front facing side of the pitch energy module housing 32, as shown. In some embodiments, this mounting configuration may be desirable to allow the pitch energy module 30 to fit within the battery housing 20 depending on the configuration of the wind turbine 10. In some embodiments, when the front mounted charger configuration is used, the external power input 48 mounted on the circuit board 36 is used instead of the external power input 48 of the charger 50. Similarly, FIG. 4B shows a front view of the pitch energy module 30 with the front mounted charger 50 relating to some embodiments of the invention. It should be understood that a variety of mounting orientations for the pitch energy module 30 are contemplated based on the mounting orientation of the batteries being replaced. For example, in some embodiments, the batteries 24 may be mounted on their side within the battery housing 20. Accordingly, the pitch energy module 30 may be mounted in a similar orientation within the battery housing 20.

Figure 4C:
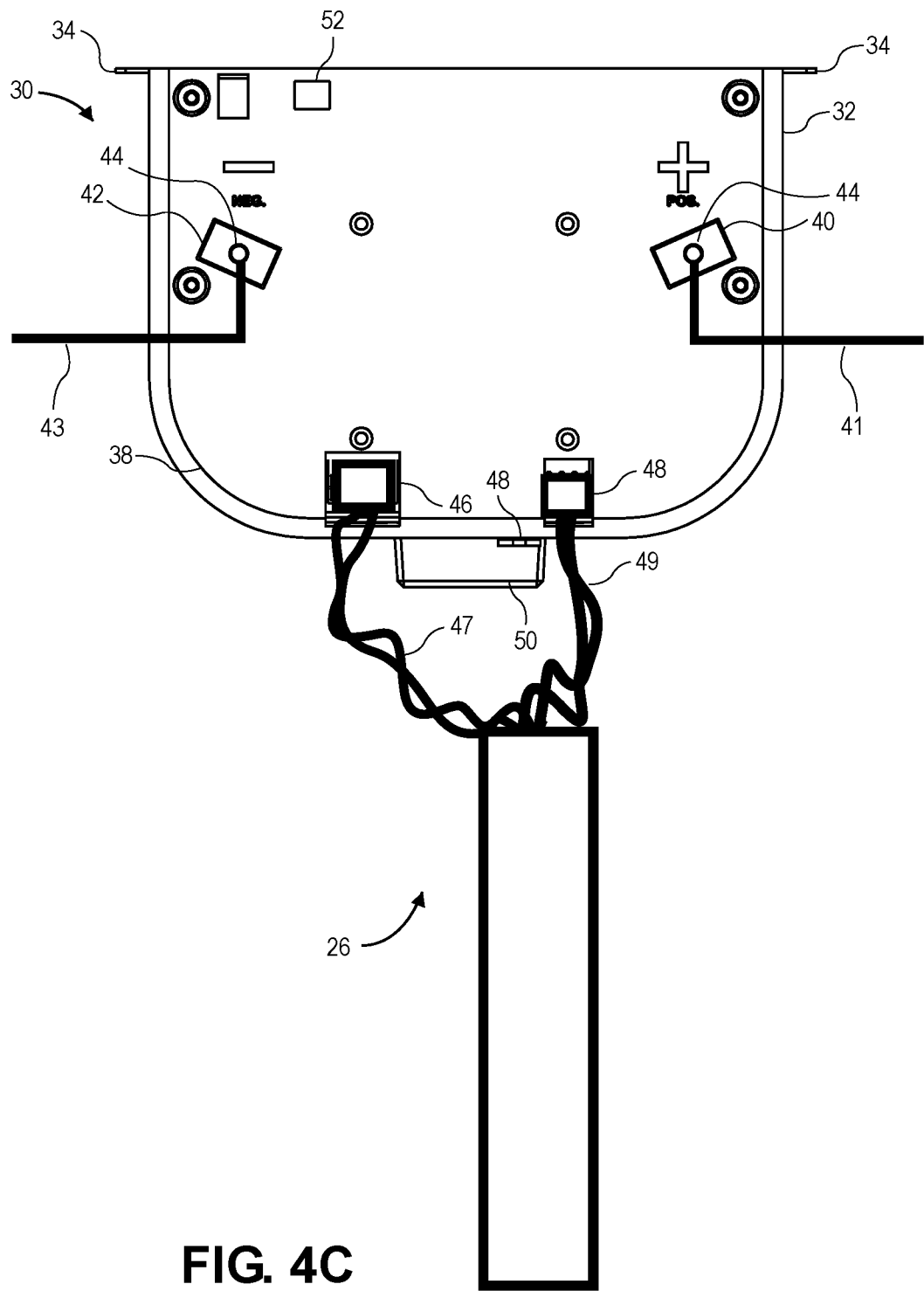
FIG. 4C depicts a top view of a pitch energy module interfacing with a battery wiring harness relating to some embodiments of the invention.

Turning now to FIG. 4C, a top view of the pitch energy module 30 with a front mounted charger 50 interfacing with the battery wiring harness 26 is depicted relating to some embodiments of the invention. Here, the cables of the battery wiring harness 26 may be coupled to the pitch energy module 30 similar to as shown in FIG. 3D, with the positive terminal cable 41 coupled to the positive terminal 40, the negative terminal cable 43 coupled to the negative terminal 42, and the communications cable 47 coupled to the communications adapter 46. However, since the pitch energy module 30 comprises a charger 50 mounted on the front of the module, the AC power input cable 49 is coupled to the external power input 48 of the pitch energy module 30. Here, the external power input 48 of the charger 50 may not be used based on the configuration of the pitch energy module 30.

EQUIVALENT SERIES RESISTANCE

In the prior art, batteries within the pitch energy system of a wind turbine are typically placed in series such that the voltages of the batteries are additive. In such prior art systems, each battery is associated with an equivalent series resistance (ESR) based on the internal resistance of the battery and the connections to the terminals of the battery. In some prior art systems, modules including ultracapacitors are installed within the pitch energy system. Typically, such modules comprise a much lower ESR compared to that of the battery being replaced because the terminals of the module are typically welded.

It should be understood that the ultracapacitors within the pitch energy module are not ideal capacitors and therefore, comprise an internal resistance affecting the flow of electrical current within the ultracapacitors. The internal resistance of the ultracapacitors along with the internal resistance associated with the connection means at the positive and negative terminals factor into the overall ESR of the pitch energy module, as discussed in detail below.

Table 1 depicted below shows the estimated ESR given in milliohms for various energy storage devices, such as battery 24, a pitch energy module 30 with bolted terminals, and a pitch energy module with welded terminals.

TABLE 1

Equivalent Series Resistance

| Battery | 9 mΩ |
|---|---|
| Welded Terminals | 4 mΩ |
| Bolted Terminals | 16 mΩ |

As discussed above, the terminals of prior art pitch energy modules are typically welded, which decreases the ESR of the pitch energy module. As shown in Table 1, a pitch energy module with welded terminals may comprise an ESR around 4 milliohms. Here, the decreased ESR associated with the welded terminals may increase the electrical efficiency of the module by allowing current to flow freely from the terminals. However, the reduced ESR may undesirably prevent the pitch energy module 30 from safely being placed in series with the battery 24. For example, it should be understood that a high ESR device placed in series with a plurality of lower ESR devices may experience a majority of the electrical load. Here, the ESR of the welded terminal pitch energy module may be substantially lower than that of the battery 24 increasing the electrical load on the battery 24. Because the electrical load of the battery 24 is increased, the battery 24 will be depleted much faster or a potential electrical fault may be experienced. Additionally, the lower ESR associated with welded terminals may undesirably increase the fault current of the module by allowing current to flow freely.

As such, it is desirable that the terminals 40 and 42 of the pitch energy module 30 comprise the bolt fasteners 44 or otherwise distribute an ESR that is similar to or greater than that of the battery 24. For example, in some embodiments, the pitch energy module 30 with the bolt fasteners 44 comprises an ESR of around 16 milliohms, as shown in Table 1. Accordingly, the batteries 24 and corresponding battery chargers may be replaced with pitch energy modules 30 one by one without damaging the existing batteries. For example, a single battery 24 may be replaced with a pitch energy module 30 such that the pitch energy module 30 is placed in series with the remaining batteries 24, as shown in FIG. 2A. As such, the installation cost associated with the pitch energy module 30 is greatly reduced because the batteries do not have to be replaced all at once.

In some embodiments, it may be desirable that the ESR is relatively high compared to typical ultracapacitor modules. Here, the ESR may increase the safety of the pitch energy module 30 by decreasing the fault current associated with the pitch energy module 30. It should be understood that the fault current of the system varies inversely with the ESR because the ESR inhibits the flow of current within the pitch energy module 30, thereby reducing the fault current. Accordingly, a pitch energy module with a higher ESR will have a lower fault current, thereby improving the safety of the module.

Further, it may be desirable that the ESR of the pitch energy module 30 is similar to or greater than that of the battery 24 such that the pitch energy module 30 can safely be placed in series with the battery 24 without increasing the electrical load experienced by the battery 24. Accordingly, the bolt fasteners 44 may be used at the terminals 40 and 42 to increase the ESR of the pitch energy module 30. Here, the bolt fasteners 44 may comprise a sufficient length and electrical resistance to increase the ESR. Accordingly, it may be desirable that the bolt fasteners are composed of a relatively non-conductive material, such as for example, stainless steel or aluminum. Additionally, the length of the bolt fasteners 44 may be increased such that the distance the current must travel is increased, thereby increasing the electrical resistance associated with the connection to the terminals 40 and 42. As should be appreciated, it may be counterintuitive to increase the resistance of the pitch energy module 30, because the increased ESR reduces the electrical efficiency of the system. However, embodiments of the present invention recognize the benefits of increasing the ESR of the pitch energy module 30 such that the pitch energy module 30 may be safely placed in series with existing batteries 24.

Figure 5:
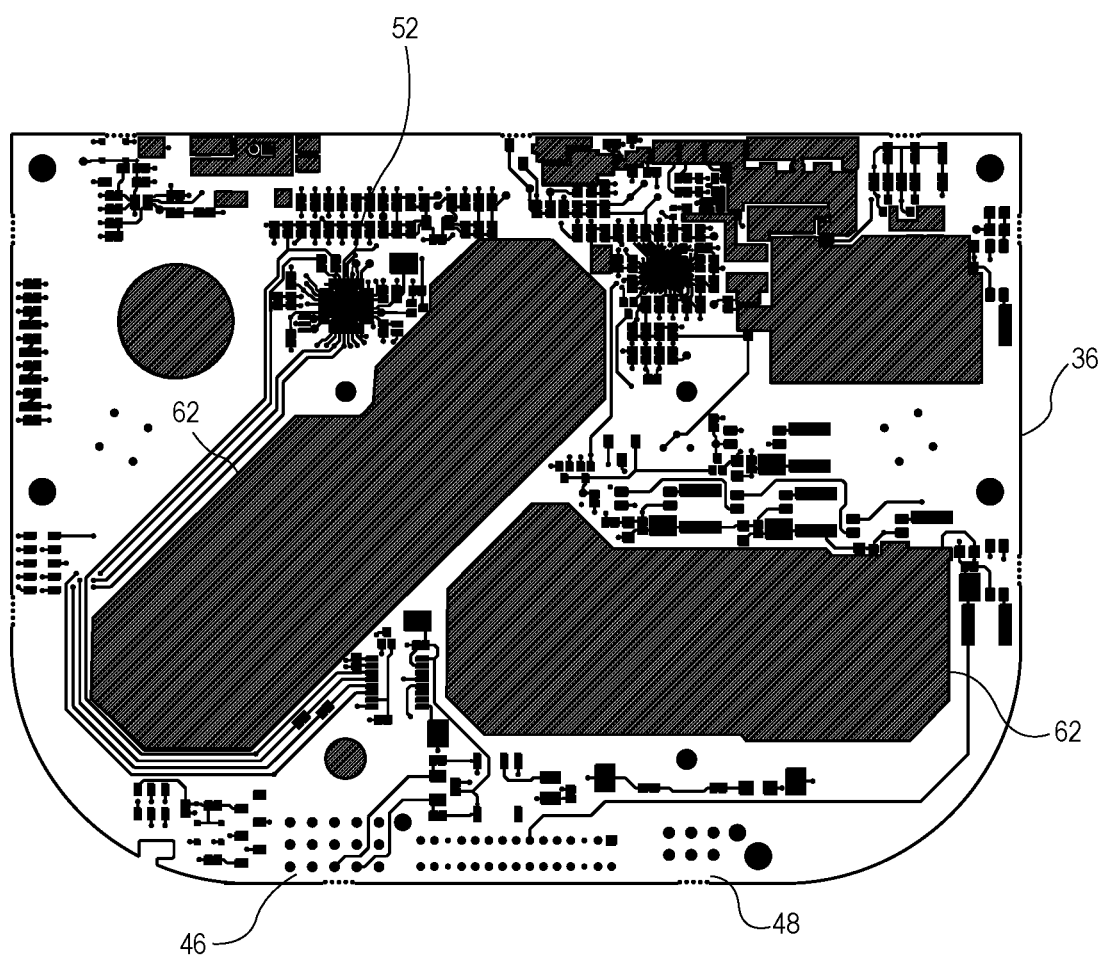
FIG. 5 depicts a circuit board relating to some embodiments of the invention.

Turning now to FIG. 5, the circuit board 36 is depicted relating to some embodiments of the invention. In such embodiments, the circuit board 36 comprises a plurality of circuit traces 62 for electrically connecting the terminals of the plurality of ultracapacitors in series. In some embodiments, the circuit traces 62 are high current circuit traces for transmitting electrical power. Here, the circuit traces 62 may be positioned on the circuit board 36 such that they contact terminals of the ultracapacitors 60 or may otherwise be integrated in or formed into the circuit board 36. Accordingly, the negative terminal of each ultracapacitor may be coupled to the positive terminal of the next ultracapacitor. Similarly, the second internal circuit board 54 may also comprise circuit traces 62 for electrically connecting the ultracapacitors 60 at the bottom of the pitch energy module housing 32.

Prior art capacitor banks typically use bus bars to electrically connect capacitors instead of circuit traces 62. Here, the bus bars are designed to withstand extreme thermal stress associated with extended use of the capacitors. However, in embodiments of the invention, the ultracapacitors 60 are only used for short bursts of energy to adjust the pitch of the blades 18. The operation time of the ultracapacitors 60 associated with adjusting the pitch of the blades 18 is relatively low when compared with other applications of capacitors. Embodiments of the invention recognize the thermal stress associated with the pitch event does not produce enough heat to significantly raise the temperature of the circuit board 36. Accordingly, the circuit traces 62 may be used to safely connect the ultracapacitors 60 in series and deliver high-power electrical energy over a short period of time without damaging the circuit board 36.

The circuit board 36 further comprises pins for the communications adapter 46 and the external power input 48, as shown. Accordingly, signals may be communicated to either of the communications adapter 46 and the external power input 48 using signal traces on the circuit board 36.

Figure 6:
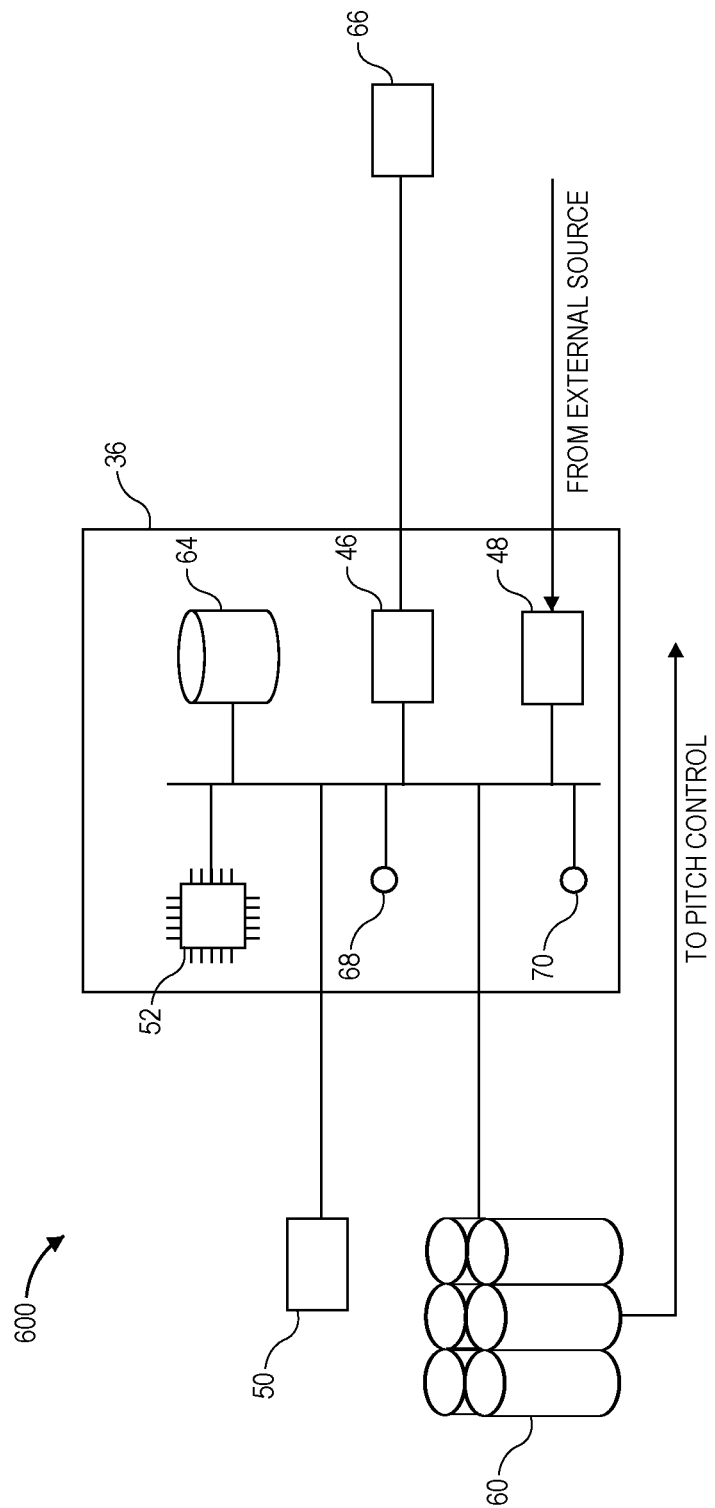
FIG. 6 depicts a control diagram relating to some embodiments of the invention.

Turing now to FIG. 6, an exemplary diagram of a pitch energy control system 600 is depicted relating to some embodiments of the invention. In some embodiments, the pitch energy control system 600 comprises the ultracapacitors 60 electrically coupled to the circuit board 36. Mounted on the circuit board 36 are the communications adapter 46, the external power input 48, the microprocessor 52, and a non-volatile memory 64. The non-volatile memory 64 may be communicatively coupled to the microprocessor 52 and comprise an erasable programmable read-only memory (EPROM) for storing information associated with the pitch energy module 30. In some embodiments, the non-volatile memory 64 stores information relating to the ultracapacitors 60 such as, for example, charge over time.

In some embodiments, the non-volatile memory 64 stores information relating the pitch energy module, such as a number of emergency pitch events, a number of full charges of the ultracapacitors 60 within the pitch energy module 30, and a number of days of operation of the pitch energy module 30. However, it should be understood that in some embodiments, the non-volatile memory 64 stores additional information relating to historic operational data of the pitch energy module 30. In some embodiments, it may be desirable to store such information within the non-volatile memory 64 to monitor and troubleshoot the pitch energy module 30.

The pitch energy control system 600 further comprises the charger 50 which may be electrically and communicatively connected through the circuit board 36 to the ultracapacitors 60. Alternatively, in some embodiments, the charger 50 may be directly connected to the ultracapacitors 60. Additionally, in some embodiments, the charger 50 may be mounted on the circuit board 36. The communications adapter 46 is communicatively coupled to a controller 66 of the wind turbine 10. In some embodiments, the controller 66 is part of the control system of the wind turbine 10. Accordingly, communications may be passed between the communications adapter 46 and the controller 66, for example, over the battery communications cable of the wiring harness 26. In some embodiments, the communications adapter 46 transmits at least one signal comprising information relating to the ultracapacitors 60. For example, the signal may comprise at least one of a voltage of the ultracapacitors 60, a charge current of the ultracapacitors 60, and a temperature of the ultracapacitors 60.

Additionally, the signal may comprise information relating to a battery test charge state, a current state of the charger (i.e., full charge or charging), or other information relating to a state of the pitch energy module 30. The battery test charge state may be used to periodically test the ultracapacitors 60. Here, a test signal is sent to the communications adapter 46 from the controller 66. Upon receiving the test signal, the pitch energy module 30 transmits a signal comprising a test response signal to the controller 66. Accordingly, the test response signal may be used to determine whether the pitch energy module 30 is working properly and is responsive to the controller 66.

In some embodiments, the circuit board 36 or an integrated circuit board of the charger 50 may be operable to measure various parameters of the pitch energy module 30. For example, the ESR and the capacitance of the pitch energy module 30 may be measured periodically using a plurality of sensors disposed on the pitch energy module 30 coupled to the circuit board 36. In some embodiments, a first sensor 68 may be communicatively coupled to the microprocessor 52 operable to measure the ESR of the pitch energy module 30, as shown. Similarly, a second sensor 70 may be communicatively coupled to the microprocessor 52 operable to measure the capacitance of the pitch energy module 30. Alternatively, in some embodiments, the sensors 68 and 70 are disposed on the charger 50. In some embodiments, the ESR and capacitance are measured individually for each ultracapacitor 60. Alternatively, the overall ESR and capacitance may be measured collectively for the plurality of ultracapacitors 60. Accordingly, it may be desirable to automatically adjust the voltage set-point of the pitch energy module 30 based on the measured parameters.

In some embodiments, it may be advantageous to automatically adjust the set-point voltage of the pitch energy module 30 based on one of the measured ESR or capacitance such that operators or administrators do not have to manually adjust the set-point voltage of the pitch energy module 30. It should be understood that prior art voltage adjustments typically require the operator to stop operation of the wind turbine 10 and climb up into the wind turbine 10 to make the adjustment manually. Accordingly, a significant amount of time and energy may be sacrificed to manually adjust the set-point voltage. In some embodiments, the set-point voltage of the pitch energy module 30 may be automatically adjusted by the microprocessor 52 based on signals received from one of the first sensor 68 or the second sensor 70. It should be understood that in some embodiments, the charger 50 further comprises a microprocessor to perform similar operations as described herein with respect to microprocessor 52. In some embodiments, both microprocessor 52 and the microprocessor of the charger 50 are included such that processing may be split between the processors.

It should be understood that, as discussed above, the electrical capacitance of the pitch energy module 30 may decrease over time, such that the energy level is resultingly reduced. Accordingly, embodiments are contemplated where the pitch energy module 30 automatically adjusts the voltage set-point based on the measured capacitance such that the energy level within the pitch energy module 30 is maintained over time. For example, the capacitance of the pitch energy module 30 may initially be around 500 Farads with a voltage set-point of 14 Volts. After extended operation, for example, 8 years, the capacitance of the pitch energy module 30 may be measured to be around 480 Farads. Accordingly, the pitch energy module 30 may automatically increase the voltage set-point to 14.5 Volts to accommodate the drop in capacitance. Here, the pitch energy module 30 may automatically adjust the voltage set-point such that a similar amount of energy is provided even after the capacitance of the pitch energy module 30 has decreased.

In some embodiments, information indicative of the signals measured by the first sensor 68 and the second sensor 70 may be communicated to an operator or administrator of the wind turbine 10, for example, through the communications adapter 46 such that the operator or administrator can monitor the operational parameters of the pitch energy module 30 remotely. Accordingly, the operator or administrator may receive the information indicative of the measured parameters and adjust the voltage set-point of the pitch energy module 30 remotely without having to stop operation of the wind turbine 10 and physically access the wind turbine 10. Alternatively, in some embodiments, the set-point voltage may be adjusted automatically by the pitch energy module 30 using software executed, for example, on the microprocessor 52.

Figure 7:
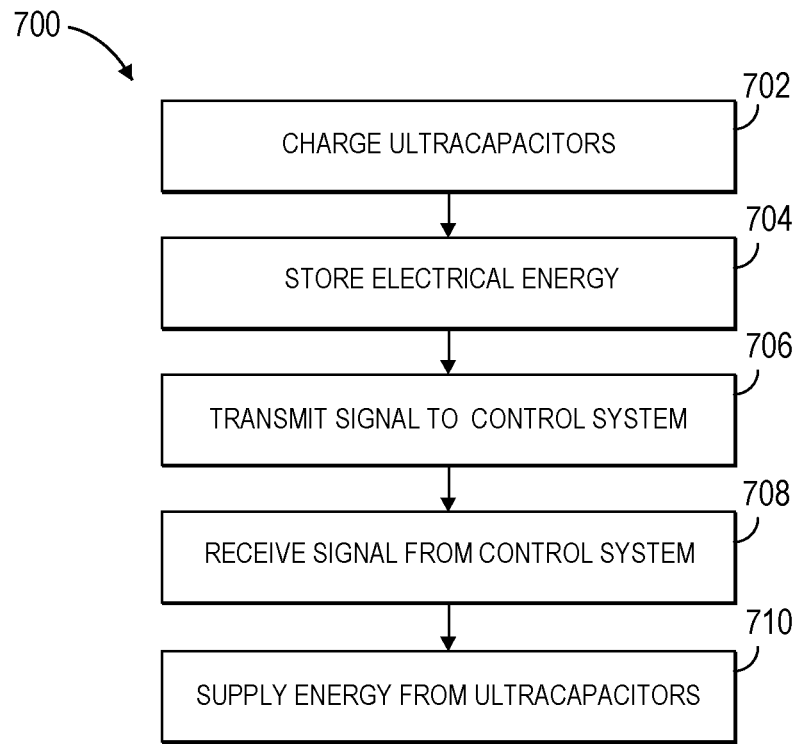
FIG. 7 depicts a method for using a pitch energy module relating to some embodiments of the invention.

Turning now to FIG. 7, a method 700 for using the pitch energy module 30 is depicted relating to some embodiments of the invention. At step 702 at least one ultracapacitor 60 of the pitch energy module 30 is electrically charged using the charger 50. Here, the power used to charge the ultracapacitors 60 may be received from the external power input 48 or from within the wind turbine 10 such as energy generated by the wind turbine 10. In some embodiments, the ultracapacitors 60 charge and discharge much faster than the batteries 24 because the electrical energy from the charger 50 does not need to be converted into chemical energy such as in the batteries 24.

At step 704 electrical energy is stored within the ultracapacitors 60. It should be understood that the energy may be stored within the ultracapacitors 60 for an arbitrary amount of time until an emergency pitch energy event occurs or a pitch test is initiated by a user. In some embodiments, each pitch energy module 30 stores about 2 Watt-hours of electrical energy when fully charged. It should be understood that in different embodiments, the energy capacity of the pitch energy module 30 may vary.

At step 706 at least one signal is transmitted to the control system of the wind turbine 10. For example, the signal may be transmitted to the controller 66 using the communications adapter 46 interfacing with the battery wiring harness 26. Here, the signal may comprise information associated with the ultracapacitors 60 of the pitch energy module 30 or state information relating to the pitch energy module 30.

At step 706 the pitch energy module 30 receives a signal from the control system of the wind turbine 10. Here, the signal may comprise a test signal or a request for a pitch adjustment received from the controller 66 via the communications adapter 46. If the signal comprises a request for a pitch adjustment, in response to receiving the signal, the pitch energy module 30 will supply energy from the ultracapacitors 60 at step 710. It should be understood that the pitch energy module 30 may also be configured to supply energy from the ultracapacitors 60 automatically in the case of a power outage where a signal is not received from the controller 66. The supplied energy may be transmitted to the motors within the wind turbine 10 to adjust the pitch of the blades 18.

In some embodiments, the pitch may be adjusted manually when a user requests a pitch test. Here, a signal may be sent from the controller 66 to the communications adapter 46 of the pitch energy module 30 requesting a pitch adjustment. Accordingly, energy is supplied from the ultracapacitors 60 and the functionality of the pitch control system is tested.

Figure 8:
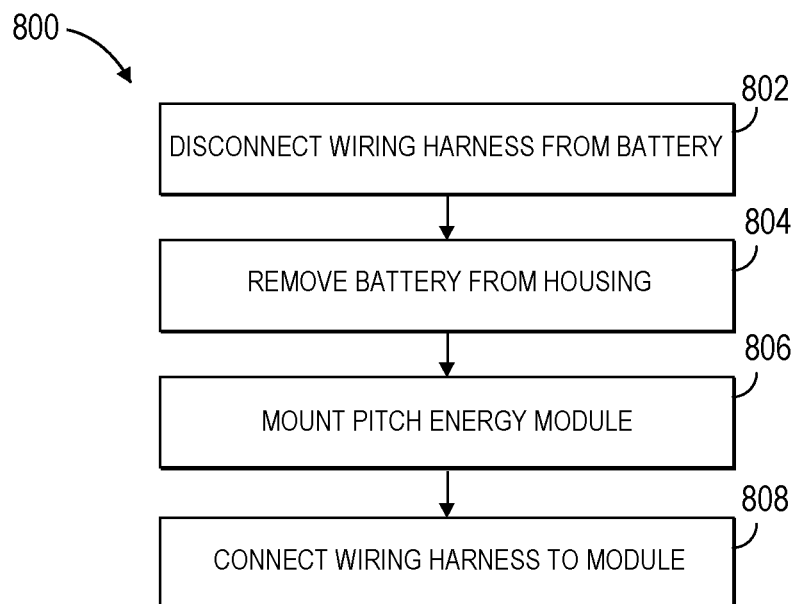
FIG. 8 depicts a method for installing a pitch energy module relating to some embodiments of the invention.

Turning now to FIG. 8, a method 800 for installing the pitch energy module 30 in the battery housing 20 is depicted relating to some embodiments of the invention. In some embodiments, the pitch energy module 30 is installed reactively after a battery 24 has been deemed faulty or has exceeded its useful lifetime. Alternatively, the pitch energy module 30 may be installed proactively, before the battery 24 has exceeded its useful lifetime to increase the efficiency of the pitch energy system.

At step 802 the battery wiring harness 26 is disconnected from the battery 24. Here, a plurality of cables of the battery wiring harness 26 may be unplugged and removed from the battery 24. For example, the battery wiring harness 26 may comprise cables disconnected from a positive terminal of the battery, a negative terminal of the battery, a communications adapter of the battery, and an external power input of the battery. At step 804 the battery 24 is removed from the battery housing 20. Here, the battery 24 may be removed by removing bolts disposed within mounting brackets of the battery 24 configured to secure the battery 24 within the frame 22 of the battery housing 20.

At step 806 the pitch energy module 30 is mounted within the battery housing 20 in place of the battery 24. Here, the bolts are disposed within the mounting brackets 34 of the pitch energy module housing 32 to secure the pitch energy module 30 to the frame 22 of the battery housing 20. In some embodiments, as discussed above the mounting brackets 34 may comprise slotted holes such that the pitch energy module 30 is adjustably mounted within the battery housing 20. Accordingly, space within the battery housing 20 may be optimized by slightly adjusting the mounting position of the pitch energy module 30.

At step 808 the battery wiring harness 26 is connected to the pitch energy module 30. Accordingly, a plurality of cables of the battery wiring harness 26 may be plugged into the pitch energy module 30. For example, cables of the battery wiring harness 26 may be connected to the positive terminal 40, the negative terminal 42, the communications adapter 46, and the external power input 48. Accordingly, the pitch energy module 30 is installed within the battery housing 20 without further modifications to the battery housing 20 or the battery wiring harness 26, such as additional communication cables or mounting structure or hardware. Here, the same battery wiring harness 26 from the battery 24 is used to connect the pitch energy module 30. In some such embodiments, it may be desirable to use the same battery wiring harness 26 and mounting mechanism such that the installation cost associated with the pitch energy module 30 is reduced. Further, the pitch energy module 30 may be installed without changing the control system of the wind turbine 10 because the pitch energy module 30 uses the same battery wiring harness and communicates with the control system of the wind turbine 10 using the same cables.

Features described above as well as those claimed below may be combined in various ways without departing from the scope hereof. The following examples illustrate some possible, non-limiting combinations:

(A1) A pitch energy module for replacing at least one battery within an electric pitch control system of a wind turbine, the at least one battery mounted in the wind turbine in a battery housing and operably coupled with the wind turbine's control system via at least a battery wiring harness. The pitch energy module includes a pitch energy module housing sized for mounting in the battery housing upon replacement of the at least one battery with the pitch energy module. One or more ultracapacitors are mounted within the pitch energy module housing, the one or more ultracapacitors configured to store electrical energy for a wind turbine emergency pitch event. The pitch energy module further includes a microprocessor mounted on or in the pitch energy module housing, the microprocessor processing a first set of information associated with the one or more ultracapacitors. A non-volatile memory is communicatively coupled with the microprocessor for storing a second set of information associated with the pitch energy module. A communications adapter, mounted on or in the pitch energy module housing is communicatively coupled with the microprocessor, the communications adapter configured to interface with a battery communications cable of the battery wiring harness to thereby transfer at least one signal comprising the first set of information associated with the one or more ultracapacitors to the control system of the wind turbine. The pitch energy module further includes a charger mounted on or in the pitch energy module housing for electrically charging the one or more ultracapacitors.

(A2) For the pitch energy module denoted as (A1), the module may further include a positive terminal electrically coupled to the one or more ultracapacitors, the positive terminal comprising a first bolt fastener for increasing an equivalent series resistance of the pitch energy module, and a negative terminal electrically coupled to the one or more ultracapacitors, the negative terminal comprising a second bolt fastener for increasing the equivalent series resistance of the pitch energy module.

(A3) For the pitch energy module denoted as any of (A1) or (A2), the module may be electrically connected in series with a second pitch energy module that is disposed within the battery housing of the wind turbine.

(A4) For the pitch energy module denoted as any of (A1) through (A3), the pitch energy module may be electrically connected in series with a battery that is disposed within the battery housing of the wind turbine.

(A5) For the pitch energy module denoted as any of (A1) through (A4), the pitch energy module further including an alternating current power input mounted on or in the pitch energy module housing for receiving electrical energy form an external power source via a power cable of the battery wiring harness to temporarily power the pitch energy module during a grid event.

(A6) For the pitch energy module denoted as any of (A1) through (A5), the charger may be selectably mounted on one of a front facing side of the pitch energy module housing or a top side of the pitch energy module housing based on a configuration of the wind turbine.

(A7) For the pitch energy module denoted as any of (A1) through (A6), the pitch energy module may further include an operating voltage of the one or more ultracapacitors that is configurable by a user to thereby increase a lifetime of the one or more ultracapacitors.

(A8) For the pitch energy module denoted as any of (A1) through (A7), the pitch energy module may further include a circuit board mounted on or in the pitch energy module housing, the circuit board is communicatively coupled to the microprocessor and the non-volatile memory. The circuit board may include a high current circuit trace for transmitting power by electrically connecting the one or more ultracapacitors in series.

(A9) For the pitch energy module denoted as any of (A1) through (A8), the pitch energy module may further include a protective fiberglass cover mounted to the pitch energy module housing and disposed over the circuit board for protecting the circuit board.

(A10) For the pitch energy module denoted as any of (A1) through (A9), the pitch energy module may be configured to be electrically connected to the battery wiring harness without depinning the battery wiring harness.

(B1) A pitch energy module for replacing a battery within an electric pitch control system of a wind turbine, the battery mounted in the wind turbine in a battery housing and operably coupled with the wind turbine's control system via at least a battery wiring harness. The pitch energy module including a pitch energy module housing sized for mounting in the battery housing upon replacement of the battery with the pitch energy module. One or more ultracapacitors are mounted within the pitch energy module housing, the one or more ultracapacitors configured to store electrical energy for a wind turbine emergency pitch event. A microprocessor is mounted on or in the pitch energy module housing, the microprocessor for processing a first set of information associated with the one or more ultracapacitors. A non-volatile memory is communicatively coupled with the microprocessor for storing a second set of information associated with the pitch energy module. A positive terminal is electrically coupled to the one or more ultracapacitors, the positive terminal comprising a first bolt fastener. A negative terminal is electrically coupled to the one or more ultracapacitors, the negative terminal comprising a second bolt fastener. The battery being replaced comprises a first equivalent series resistance. The first bolt fastener and the second bolt fastener achieve a second equivalent series resistance for the pitch energy module that is higher than the first equivalent series resistance of the battery. A communications adapter is mounted on or in the pitch energy module housing and is communicatively coupled with the microprocessor. The communications adapter is configured to interface with a battery communications cable of the battery wiring harness to thereby transfer at least one signal comprising the first set of information associated with the one or more ultracapacitors to the control system of the wind turbine. The pitch energy module further includes a charger mounted on or in the pitch energy module housing for electrically charging the one or more ultracapacitors.

(B2) For the pitch energy module denoted as (B1), the pitch energy module may further include a plurality of mounting brackets including slots for adjustably securing the pitch energy module within a battery mounting position in the battery housing of the wind turbine.

(B3) For the pitch energy module denoted as any of (B1) or (B2), the pitch energy module may be disposed within a rotor of the wind turbine with at least one battery, and each of the pitch energy module and the at least one battery may supply electrical power during a wind turbine emergency pitch event.

(B4) For the pitch energy module denoted as any of (B1) through (B3), the charger may be selectably mounted on one of a front facing side of the pitch energy module housing or a top side of the pitch energy module housing based on a configuration of the wind turbine, and the charger may be held at a floating voltage potential of the pitch energy module.

(C1) A pitch energy system for replacing at least one battery within an electric pitch control system of a wind turbine, the at least one battery mounted in the wind turbine in a battery housing and operably coupled with the wind turbine's control system via at least a battery wiring harness. The pitch energy system includes a plurality of pitch energy modules electrically connected in series. Each of the pitch energy modules includes a pitch energy module housing sized for mounting in the battery housing upon replacement of the at least one battery with the pitch energy module. One or more ultracapacitors are mounted within the pitch energy module housing, the one or more ultracapacitors configured to store electrical energy for a wind turbine emergency pitch event. The pitch energy module further includes a microprocessor mounted on or in the pitch energy module housing, the microprocessor processing a first set of information associated with the one or more ultracapacitors. A non-volatile memory is communicatively coupled with the microprocessor for storing a second set of information associated with the pitch energy module. A communications adapter, mounted on or in the pitch energy module housing is communicatively coupled with the microprocessor, the communications adapter configured to interface with a battery communications cable of the battery wiring harness to thereby transfer at least one signal comprising the first set of information associated with the one or more ultracapacitors to the control system of the wind turbine. The pitch energy module further includes a charger mounted on or in the pitch energy module housing for electrically charging the one or more ultracapacitors.

(C2) For the pitch energy system denoted as (C1), the pitch energy system may further include a battery electrically connected in series with the plurality of pitch energy modules, the battery configured to store electrical energy for the wind turbine emergency pitch event.

(C3) For the pitch system module denoted as any of (C1) or (C2), during the wind turbine emergency pitch event, a first portion of electrical energy for the wind turbine emergency pitch event may be supplied by the plurality of pitch energy modules and a second portion of electrical energy for the wind turbine emergency pitch event may be supplied by the battery.

(C4) For the pitch energy system denoted as any of (C1) through (C3), each of the pitch energy modules may further include a circuit board mounted on or in the pitch energy module housing. The circuit board may be communicatively coupled to the microprocessor and the non-volatile memory. The circuit board may further include a high current circuit trace for transmitting power by electrically connecting the one or more ultracapacitors in series.

(C5) For the pitch energy system denoted as any of (C1) through (C4), the second set of information stored on the non-volatile memory may further include at least one of a number of wind turbine emergency pitch events, a number of full charges of the respective pitch energy module, and a number of days of operation of the respective pitch energy module.

(C6) For the pitch energy system denoted as any of (C1) through (C5), the charger of each of the plurality of pitch energy modules may be selectably mounted on one of a front facing side of the respective pitch energy module housing or a top side of the respective pitch energy module housing based on a configuration of the wind turbine.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An energy module operably coupled with a control system of a wind turbine via at least a wiring harness, the energy module comprising:
    an energy module housing sized for mounting in a battery housing of the wind turbine;
    one or more ultracapacitors mounted within the energy module housing, the one or more ultracapacitors configured to store electrical energy for the wind turbine;
    at least one processor communicatively coupled to the one or more ultracapacitors; and
    one or more non-transitory computer-readable media that store computer-executable instructions that, when executed by the at least one processor, automatically adjust a voltage set-point of the energy module based on a measured parameter of the energy module to thereby increase a lifetime of the one or more ultracapacitors of the energy module.

2. The energy module of claim 1, wherein the energy module is electrically connected in series with at least one battery.

3. The energy module of claim 2, wherein an equivalent series resistance of the energy module is greater than a battery equivalent series resistance of the at least one battery.

4. The energy module of claim 1, further comprising:
    a positive terminal electrically coupled to a positive cable of the wiring harness and disposed on the energy module housing; and
    a negative terminal electrically coupled to a negative cable of the wiring harness and disposed on the energy module housing.

5. The energy module of claim 4,
    wherein the positive terminal comprises a first bolt fastener configured to selectively secure the positive cable of the wiring harness to the positive terminal, and
    wherein the negative terminal comprises a second bolt fastener configured to selectively secure the negative cable of the wiring harness to the negative terminal.

6. The energy module of claim 1, wherein the one or more ultracapacitors comprise at least one hybrid capacitor comprising an electrostatic storage portion and an electrochemical storage portion.

7. An energy module operably coupled with a control system of a wind turbine via at least a wiring harness, the energy module comprising:
    an energy module housing sized for mounting in a battery housing of the wind turbine;
    a plurality of ultracapacitors mounted within the energy module housing, the plurality of ultracapacitors configured to store electrical energy for the wind turbine;
    at least one processor communicatively coupled to the plurality of ultracapacitors; and
    one or more non-transitory computer-readable media that store computer-executable instructions that, when executed by the at least one processor, automatically adjust a voltage set-point of the energy module based on a measured parameter of the energy module to thereby increase a lifetime of the plurality of ultracapacitors of the energy module.

8. The energy module of claim 7, further comprising:
    a circuit board comprising a circuit trace coupled to the plurality of ultracapacitors thereby electrically connecting the plurality of ultracapacitors in series.

9. The energy module of claim 7, wherein the computer-executable instructions, when executed by the at least one processor, cause the energy module to transmit a signal including information indicative of a charge state of the plurality of ultracapacitors.

10. The energy module of claim 9, wherein the signal further includes information indicative of a voltage of the plurality of ultracapacitors.

11. The energy module of claim 10, wherein the signal further includes information indicative of a temperature of the plurality of ultracapacitors.

12. The energy module of claim 7, wherein the measured parameter comprises a capacitance of the energy module.

13. The energy module of claim 7, wherein the measured parameter comprises an equivalent series resistance of the energy module.

14. An energy system comprising a plurality of energy modules operably coupled with a control system of a wind turbine via at least a wiring harness, each energy module of the plurality of energy modules comprising:
    an energy module housing sized for mounting in a battery housing of the wind turbine;
    a plurality of ultracapacitors mounted within the energy module housing, the plurality of ultracapacitors configured to store electrical energy for the wind turbine;

at least one processor communicatively coupled to the plurality of ultracapacitors; and one or more non-transitory computer-readable media that store computer-executable instructions that, when executed by the at least one processor, automatically adjust a voltage set-point of the energy module based on a measured parameter of the energy module to thereby increase a lifetime of the plurality of ultracapacitors of the energy module.

15. The energy system of claim 14, further comprising:
at least one charger coupled to the plurality of energy modules for charging the plurality of ultracapacitors.

16. The energy system of claim 15, wherein the at least one charger is communicatively coupled to the at least one processor.

17. The energy system of claim 15, wherein the at least one charger is a battery charger configured to electrically charge one or more batteries.

18. The energy system of claim 15, wherein the at least one charger is held at a floating electrical potential.

19. The energy system of claim 18, wherein the at least one charger is mounted on the energy module housing.

20. The energy system of claim 14, wherein the measured parameter comprises a capacitance of the energy module.

* * * * *